(12) United States Patent
Simonson

(10) Patent No.: US 6,219,028 B1
(45) Date of Patent: Apr. 17, 2001

(54) REMOVING A CURSOR FROM OVER NEW CONTENT

(75) Inventor: Howard C. Simonson, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/136,873

(22) Filed: Aug. 19, 1998

(51) Int. Cl.[7] .................................................... G09G 5/08
(52) U.S. Cl. .............................................. 345/145; 345/157
(58) Field of Search .................................... 345/145, 146, 345/157, 156, 162, 163, 161, 167, 168, 169

(56) References Cited

U.S. PATENT DOCUMENTS

| 4,760,386 | * | 7/1988 | Heath et al. ........................ 345/180 |
| 5,367,631 | * | 11/1994 | Levy .................................... 345/163 |
| 5,596,347 | * | 1/1997 | Robertson et al. .................. 345/145 |
| 5,598,183 | * | 1/1997 | Robertson et al. .................. 345/145 |
| 5,623,666 | * | 4/1997 | Pike et al. ............................ 707/200 |
| 5,920,304 | * | 7/1999 | Berstis ................................. 345/145 |
| 6,005,550 | * | 12/1999 | Vaughan et al. .................... 345/157 |

\* cited by examiner

*Primary Examiner*—Xiao Wu
(74) *Attorney, Agent, or Firm*—Fish & Richardson P.C.

(57) ABSTRACT

Methods and apparatus implementing a technique for displaying content on a display device of a computer system and removing a cursor so it does not obscure the content as it is being displayed. In general, in one aspect, the technique includes identifying a cursor region occupied by the cursor on a display device screen, detecting collisions between new content and the cursor region, and removing the cursor from its position on the screen in response to collisions. As a result, the cursor does not obscure the new content on the screen.

22 Claims, 2 Drawing Sheets

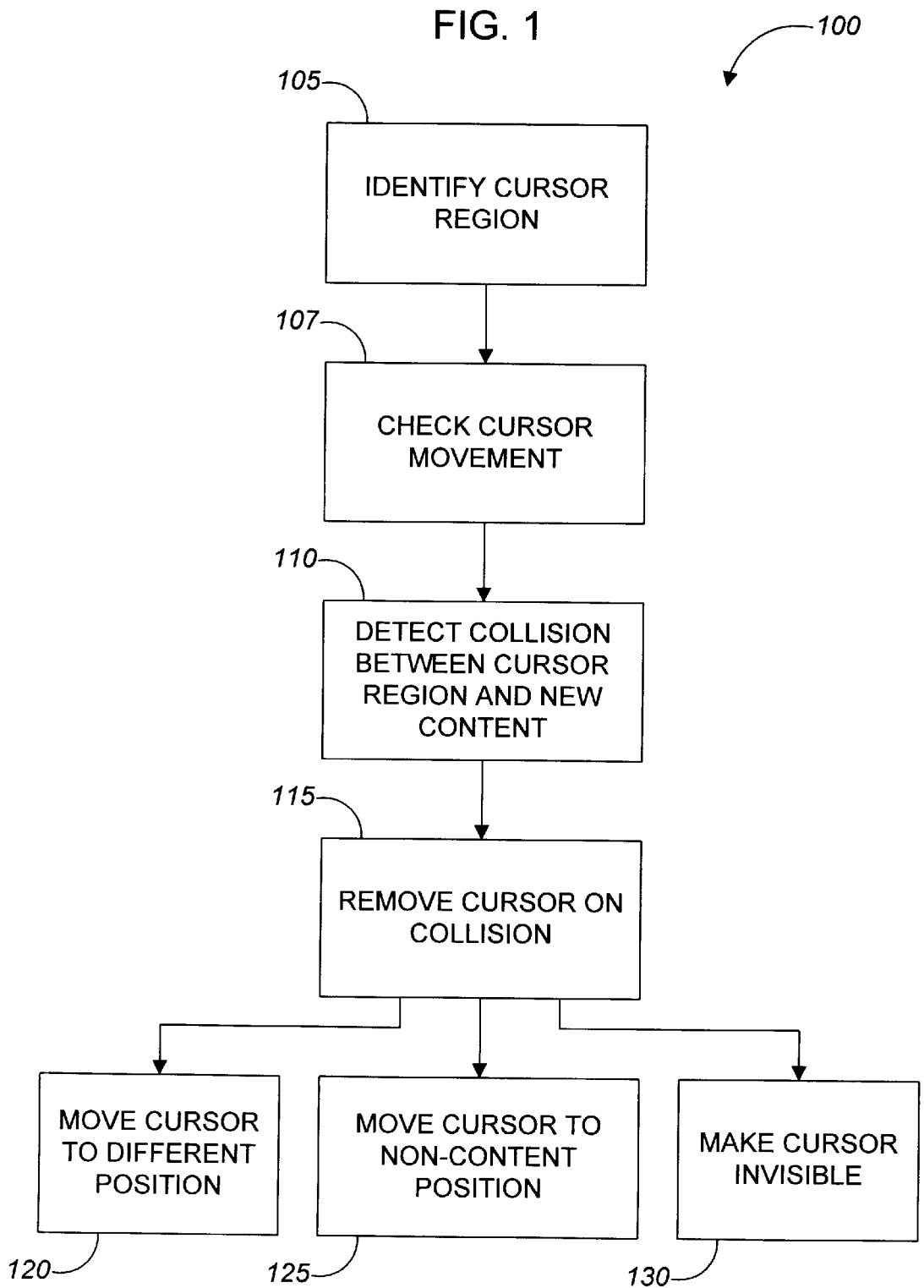

REMOVING A CURSOR FROM OVER NEW CONTENT

BACKGROUND OF THE INVENTION

The invention relates to displaying content and managing a cursor in a graphical user interface of a computer system.

Computer system graphical user interfaces, such as are provided by the Mac OS® or Windows® 95 operating systems, typically include a floating cursor. The user interface displays the floating cursor on a display screen superimposed over the "real" content of the screen, such as graphics or text. A user typically causes the floating cursor to move in response to gestures applied to a pointing device, such as a mouse, or by commands entered through a keyboard. Because the floating cursor would otherwise be displayed, the user typically moves the cursor to a different portion of the screen to see content obscured by the cursor.

In some conventional word processing application programs, the program causes the floating cursor to disappear when the user begins to type to enter text. While this is useful, the floating cursor still obscures text when the user performs some action other than typing text, such as scrolling through the document or opening a new document.

In addition, other application programs which display images typically do not alter the cursor when displaying new content. For example, in a web browser application, such as Netscape Navigator™, when a user clicks on a link, the browser displays a new page of content. The cursor, however, is still in the same location on the screen and often obscures some of the new content.

SUMMARY

The invention provides apparatus and methods implementing a technique for displaying content on a display device of a computer system and removing a cursor so it does not obscure the content as it is being displayed. In general, in one aspect, the technique includes identifying a cursor region occupied by the cursor on a display device screen, detecting collisions between new content and the cursor region, and removing the cursor from its position on the screen in response to collisions. As a result, the cursor does not obscure the new content on the screen.

Advantages that may be seen in implementations of the invention include one or more of the following. The user does not need to move the cursor manually to reveal graphics obscured by the cursor. Because the user does not have to move the cursor repeatedly to reveal obscured content, the efficiency and comfort of the user's interaction with the computer system is improved. If the cursor is automatically moved to a functional location, such as a button or a scroll bar, the user's efficiency may be improved.

BRIEF DESCRIPTION OF THE DRAWINGS

FIG. 1 is a flow chart of the operation of a computer system according to the invention.

DETAILED DESCRIPTION

Figure 2A:
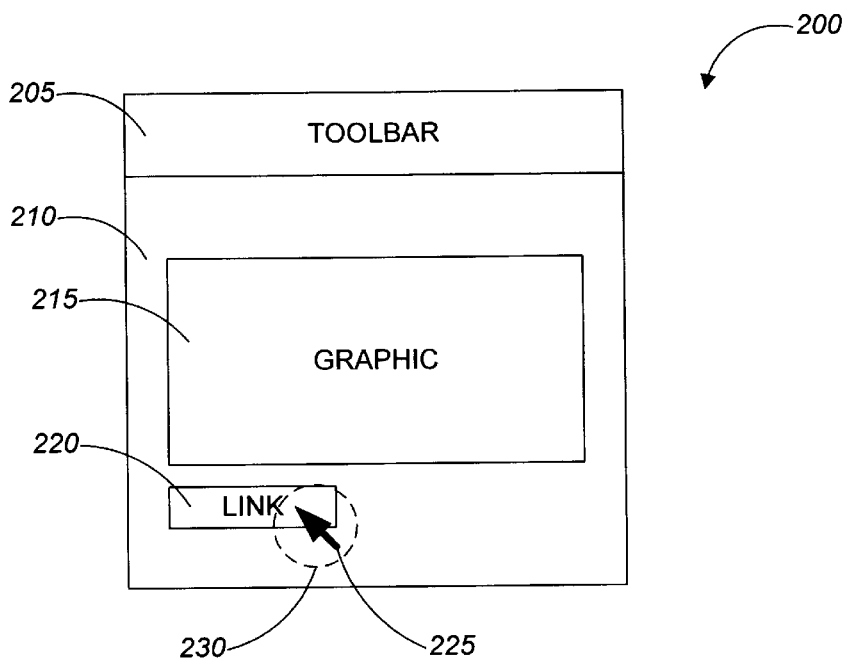
FIGS. 2A and 2B illustrate an example of the operation of the computer system.

The invention provides methods and apparatus for displaying content on a display screen in a computer system of the kind that includes a graphical user interface with a floating cursor.

As shown in FIG. 1, in a process 100 of displaying new content on a display screen, the computer system identifies a region occupied by the cursor (step 105). The cursor region represents a region of the display screen occupied by the image of the cursor. The cursor region can be larger and of a different shape than the cursor image; for example, it can be a bounding box. The computer system monitors the movement of the cursor to determine whether the cursor has been stationary for a default time period (step 107).

As the computer system displays new content on the screen, the computer system monitors the region of the screen which the new content occupies or will occupy. Content can be graphics or text. In one implementation, content does not include user-interface graphics, such as buttons, menubars, toolbars, or window decorations. In another implementation, content does not include user-defined controls, such as links in a browser application program. Alternatively, the user can supply or select limitations on what constitutes content.

If the cursor has been stationary for the required time period, the computer system compares the new-content region to the cursor region. If the regions intersect—that is, if the content intersecting the cursor region of the screen changes (or is going to change) after the cursor stops in a location—the computer system recognizes a collision (step 110). Collisions occur when content is to be displayed. For example, collisions do not occur for content in a window which is completely obscured by other windows. When the obscured window is revealed and redrawn, the content of the redrawn portions can generate collisions. When a collision occurs, the operating system, the active application, or some other component of the computer system removes the cursor (step 115). A collision indicates the cursor obscures the new content or is in close proximity to the object. Removing the cursor can be accomplished in a number of ways, such as by moving the cursor to a different position on the screen where the cursor does not obscure the new content (step 120), by moving the cursor to a position on the screen where content is not displayed by application programs, such as a menu bar or tool bar (step 125), or by making the cursor transparent (step 130). The cursor can also be moved to a functional position on the screen, such as a scroll bar, according to a default setting or the user can supersede the default setting for an application or system-wide. Optionally, if the user interface gives windows focus by the position of the cursor, the cursor is not moved outside the active window. Alternatively, the computer system can remove the cursor by changing the appearance of the cursor, such as by making the cursor invisible, by changing the cursor to an outline image, or by clipping the cursor to reveal the otherwise-obscured content. The computer can return the cursor to its original appearance in response to user activity, such as moving the mouse, or computer activity, such as closing a window. In another implementation, the computer system returns the cursor to its original appearance or location after a default time period. Alternatively, the user can select conditions for returning the cursor.

The task of detecting collisions can be performed by the operating system or by an application. In one implementation, the operating system periodically checks whether the cursor region collides with new content to be displayed. The operating system checks for collisions in the frame buffer for the display device. Alternatively, the operating system checks as content is rendered in an off-screen buffer. Similarly, the task of removing the cursor and deciding how and, as applicable, where to remove the cursor can be performed by the operating system, the application in which the collision occurred, or both. In one implementation, in which the operating system detects the collision and the application responds to it, the operating system detects that new content is to be displayed in the cursor region (or would be displayed there if the cursor were elsewhere) and sends a message to the application owning the window in which the new content is displayed. In response, that application (which need not be the active application) removes the cursor.

In one implementation, the operating system detects collisions which occur outside the active window. For example, when a first window which obscures a second window is closed, the portion of the second window which was obscured is redrawn. If the cursor region intersects this redrawn portion, a collision is detected. Alternatively, an application program can detect such collisions. In one such implementation, the application detects collisions which occur within the application's windows and windows managed by other applications.

The behavior of removing the cursor can be controlled by the user by setting parameters for the computer system or for particular applications. For example, the user can select from alternatives set forth above, or select an absolute or relative distance, direction, or location to which the cursor is to be removed in the event of a collision with new content. This can be based on the nature of the new content and the direction in which it is drawn. It can also be based on the nature of the window in which the cursor is found. In addition, the user can select to remove the cursor, or not to remove the cursor, from collisions occurring in selected areas of the screen or selected parts of a window, such as a menu bar, a scroll bar, a status bar, or a status display region, such as a clock. Similarly, the user can select to remove or not to remove the cursor when a collision occurs outside the active window. The user can also supply or select the time period for which the cursor must be stationary before checking for collisions.

Figure 2B:
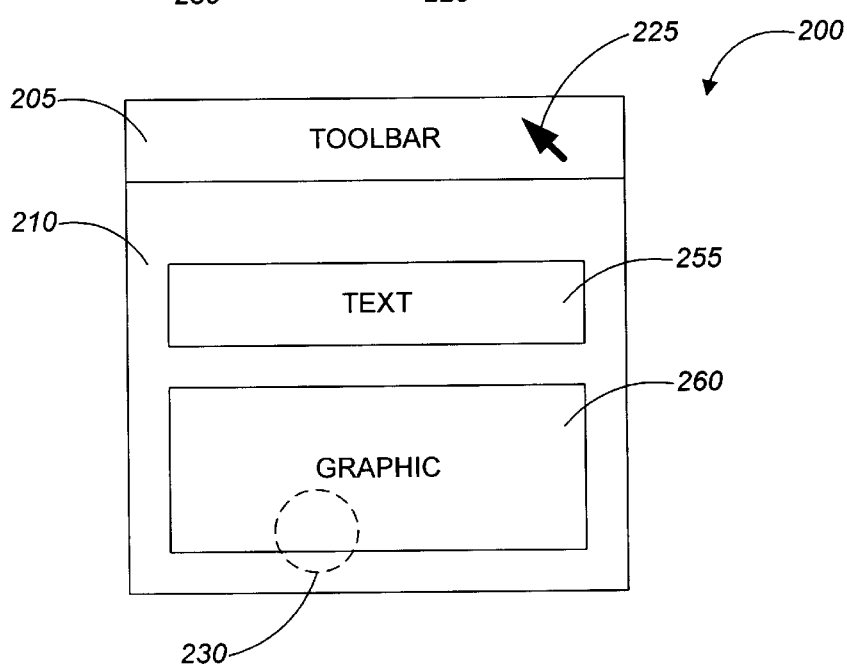

FIGS. 2A and 2B illustrate the process 100 (FIG. 1) in the context of a web browser application program. As shown in FIG. 2A, a window 200 displayed on a display screen (not shown) includes a toolbar 205 and a pane 210 for displaying content. In the pane 210 is displayed a graphic 215 and a link 220. A cursor 225 is positioned in the window 200 over the link 220 at a position approximated by a dashed circle 230. The cursor region for the cursor 225 is not necessarily the shape indicated by circle 230. When the user clicks on the link 220, the application program begins to display new content in the pane 210.

As shown in FIG. 2B, the pane 210 changes to display the new contents. In FIG. 2B, the pane displays text 255 and a graphic 260. As the computer system displays the text 255, the computer system compares the region occupied by the text 255 and the region occupied by the cursor 225. The text 255 and the original position of the cursor 225 indicated by circle 230 do not intersect and so the text 255 and the cursor 225 do not collide. As the computer system displays the graphic 260 for the first time, the computer system compares the region occupied by the graphic 260 and the region occupied by the cursor 225. Because the regions intersect, the computer system recognizes a collision and the cursor is removed to the toolbar 225. In this way, the cursor 225 does not obscure the new content in the pane 210.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can advantageously be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Other implementations are within the scope of the following claims. For example, the steps of the invention can be performed in a different order and still achieve desirable results.

What is claimed is:

1. In an apparatus of the kind having a user interface in which a cursor is displayed on a display screen and moved in response to actions of a user, a method of displaying content on the display screen, comprising:

identifying a cursor region corresponding to a region of the screen occupied by the cursor;

detecting a collision between the cursor region and a content region of the screen where new content is to be displayed, the content region covering less than the entire visible screen; and removing the cursor from its position on the screen when a collision is detected, whereby the cursor does not obscure the new content on the screen.

2. The method of claim 1, wherein:

the cursor region is larger than the cursor.

3. The method of claim 1, wherein:

removing the cursor comprises moving the cursor to a different location, wherein the cursor remains visible on the screen.

4. The method of claim 1, wherein:

removing the cursor comprises making the cursor invisible.

5. The method of claim 1, wherein:

removing the cursor comprises making the cursor invisible for a user-selected period of time or until the user acts to move the cursor.

6. The method of claim 1, further comprising:

returning the cursor to its original position after a period of time or in response to user activity or computer activity.

7. The method of claim 6, wherein:

returning the cursor comprises returning the cursor to its original appearance.

8. The method of claim 1, wherein:

removing the cursor comprises making the cursor appear as an outline.

9. The method of claim 1, wherein:

removing the cursor comprises clipping the cursor.

10. The method of claim 1, wherein:

the content is text.

11. The method of claim 1, further comprising:

receiving a user input; and removing the cursor in accordance with the user input.

12. The method of claim 1, further comprising:

identifying a direction of the displaying of the content; and wherein removing the cursor includes moving the cursor in a direction determined in reference to the direction of the displaying.

13. The method of claim 1, further comprising:

removing the cursor to a region of the display screen having no content, wherein the cursor remains visible on the screen.

14. The method of claim 1, wherein:

the cursor is not removed if the cursor has not been stationary for a user-selected period of time.

15. A computer system for displaying content on a display screen, where the computer system is of the kind having a user interface in which a cursor is displayed on the display screen and moved in response to actions of a user, the computer system comprising:

means for identifying a cursor region corresponding to a region of the screen occupied by the cursor;

means for detecting a collision between the cursor region and a content region of the screen where new content is to be displayed, the content region covering less than the entire visible screen; and means for removing the cursor from its position on the screen when a collision is detected, whereby the cursor does not obscure the new content on the screen.

16. The computer system of claim 15, wherein:

removing the cursor comprises moving the cursor to a different location, wherein the cursor remains visible on the screen.

17. The computer system of claim 15, further comprising:

means for receiving a user input; and means for removing the cursor in accordance with the user input.

18. The computer system of claim 15, further comprising:

means for removing the cursor to a region of the display screen having no content, wherein the cursor remains visible on the screen.

19. In an apparatus of the kind having a user interface in which a cursor is displayed on a display screen and moved in response to actions of a user, a computer program for displaying content on the display screen, the computer program including instructions to cause the computer system to:

identify a cursor region corresponding to a region of the screen occupied by the cursor;

detect a collision between the cursor region and a region of the screen where new content is to be displayed, the content region covering less than the entire visible screen; and remove the cursor from its position on the screen when a collision is detected, whereby the cursor does not obscure the new content on the screen.

20. The computer program of claim 19, wherein:

removing the cursor comprises moving the cursor to a different location, wherein the cursor remains visible on the screen.

21. The computer program of claim 19, further including instructions to cause the computer system to:

receive a user input; and remove the cursor in accordance with the user input.

22. The computer program of claim 19, further including instructions to cause the computer system to:

remove the cursor to a region of the display screen having no content, wherein the cursor remains visible on the screen.

* * * * *